INVENTOR
ODDES O. BLACKMAN
BY John N. Randolph
ATTORNEY

United States Patent Office 3,611,594
Patented Oct. 12, 1971

3,611,594
SCRAPER AND LOADER
Oddes O. Blackman, Rte. 1, Box 97, Zwolle, La. 71486
Filed Sept. 24, 1969, Ser. No. 860,567
Int. Cl. E02f 3/62
U.S. Cl. 37—1                                           8 Claims

ABSTRACT OF THE DISCLOSURE

A machine drawn by a draft vehicle having a scraping blade disposed obliquely to its direction of travel, and a closed frame side functioning with a rear end of the scraping blade to confine the scrapings. A screw type conveyor has an inlet end operating in the confined space for conveying the scraping upwardly and forwardly for discharge into the body or hopper of the draft vehicle. Gauge means on the frame sides enables the scraping depth of the blade to be varied Adjustability of the draft tongue enables the machine to be supported solely by its engagement with the ground while in operation, and partially by the draft vehicle, when not in operation, for backing or for transporting the machine.

SUMMARY

It is a primary object of the present invention to provide a novel machine primarily intended for use in cleaning the earth or dirt floors of large chicken houses conventionally utilized for raising broiler chickens, and by which the litter, usually comprising sawdust or shavings and droppings from the chickens, can be scraped up and conveyed by the machine into a vehicle by which the machine is pulled, to obviate the necessity of cleaning such dirt floors manually with shovels.

Another object of the invention is to provide a machine having novel gauge means which are adjustable for varying the scraping depth of the blade.

A further object of the invention is to provide a machine having a draft tongue which is adjustable between a pivotal and rigid attachment to the machine whereby the machine is supported solely by its engagement with the ground when the tongue is pivotally attached thereto; and partially by the draft vehicle, when the tongue is rigidly attached, with the scraping blade and forward end of the machine elevated for transporting or backing the machine.

A further object of the invention is to provide a machine of extremely simply construction, which may be economically manufactured, which will be efficient and durable in use, and which will materially reduce the labor involved in connection with cleaning chicken houses and similar operations conventionally accomplished manually.

Various other objects and advantages of the invention will hereinafter become more fully apparent from the following description of the drawings, illustrating a presently preferred embodiment thereof, and wherein:

BRIEF DESCRIPTION OF THE DRAWINGS

FIG. 7 is an enlarged transverse sectional view taken substantially along the line 7—7 of FIG. 3;

FIG. 8 is an enlarged fragmentary vertical sectional view, taken substantially along a plane as indicated by the line 8—8 of FIG. 3, and FIG. 9 is an enlarged cross sectional view taken substantially along a plane as indicated by the line 9—9 of FIG. 3.

DESCRIPTION OF THE PREFERRED EMBODIMENT

Figure 1:
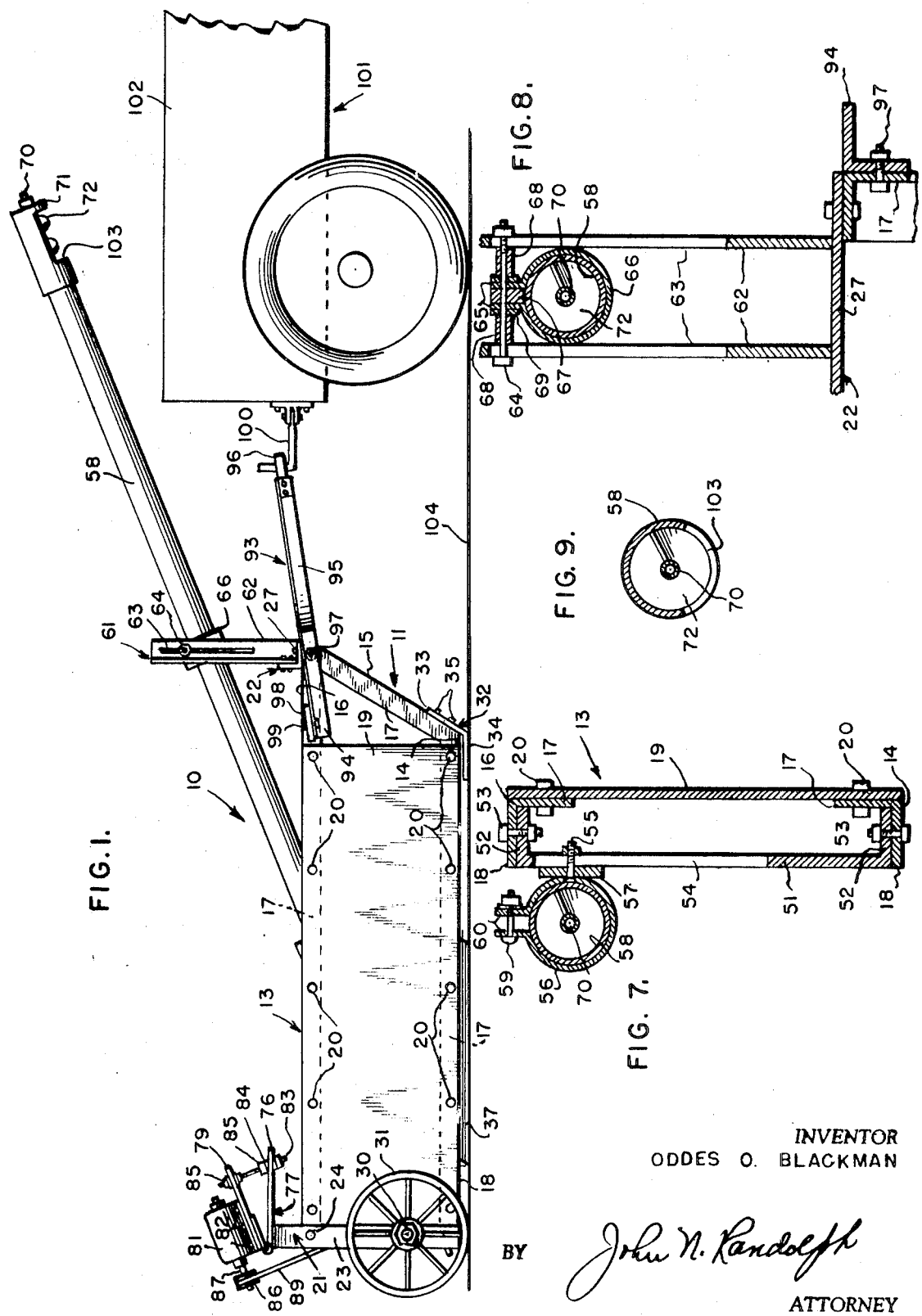
FIG. 1 is a side elevational view, partly broken away, showing the scraper and loader in an operative position connected to a draft vehicle.

Referring more specifically to the drawings, the scraping and loading machine in its entirety and comprising the invention is designated generally 10 and includes an elongated frame 11 having sides 12 and 13.

The sides 12 and 13 each includes a substantially straight elongated bottom portion forming a runner 14, an upwardly and forwardly inclined portion 15 which rises from the forward end of the runner 14, and a horizontal top portion 16 which extends from the upper end of the portion 15 to the rear end of the runner 14, and which is disposed directly thereabove and spaced therefrom. The parts 14, 15 and 16 of each side 12 and 13 are of one piece construction and formed of angle iron, including an outer vertically disposed flange 17 and an inwardly extending flange 18. The flanges 18 are disposed at the bottom of the runners 14, at the tops of the top portions 16 and at the front of the inclining front portions 15. The right hand side member 13 differs from the left hand side member 12 in that a plate 19 is secured by fastenings 20 to the vertical flanges 17 of the runner 14 and top portion 16. The plate 19 extends from adjacent the front portion 15 to adjacent the rear ends of the members 14 and 16.

Figure 4:
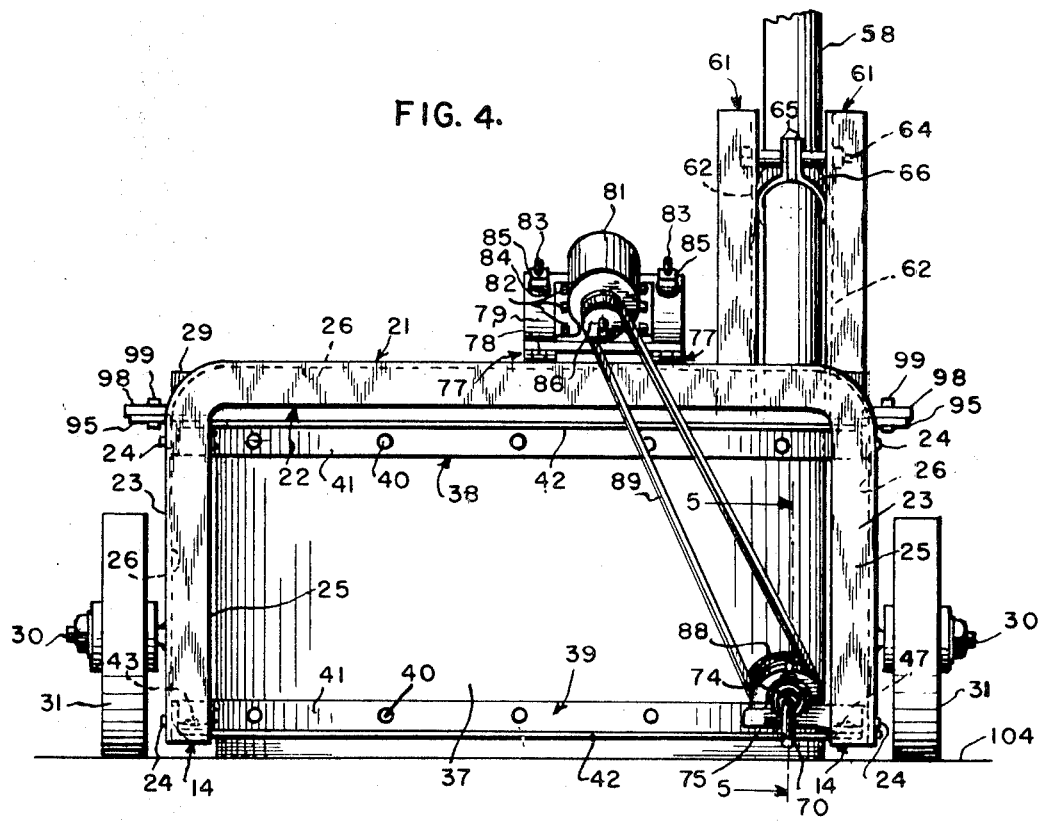
FIG. 4 is an enlarged fragmentary rear elevational view of the machine.

The frame 11 also includes a rear arch-shaped axle 21 and a front cross member 22, each of which is also formed of angle iron. The depending ends or legs 23 of the axle 21 are secured to the rear ends of the members 14 and 16 or the sides 12 and 13 by fastenings 24, as best seen in FIG. 4, one of said legs 23 being disposed immediately behind the plate 19. The arch member 21 has a rear vertical flange 25 and a forwardly extending flange 26, which extends from the outer edge of the flange 25. The front cross member 22 extends betwen the forward ends of the top members 16 and has a horizontal bottom flange 27 which is secured by fastenings 28 to the forward end of the members 16, and an upstanding rear flange 29. The axle 21 and cross member 22 support the frame sides 12 and 13 in spaced apart substantially parallel relation to one another, as best seen in FIG. 2.

Stub axles 30 project outwardly from the flanges 26 of the axle legs 25. Transversely aligned ground engaging wheels 31 are journaled on the stub axles 30 and are of a diameter to extend slightly below the lower ends of the legs 25 and the rear ends of the runners 14, which are disposed at the same levels as the lower ends of said legs 25, as seen in FIG. 4.

Figure 3:
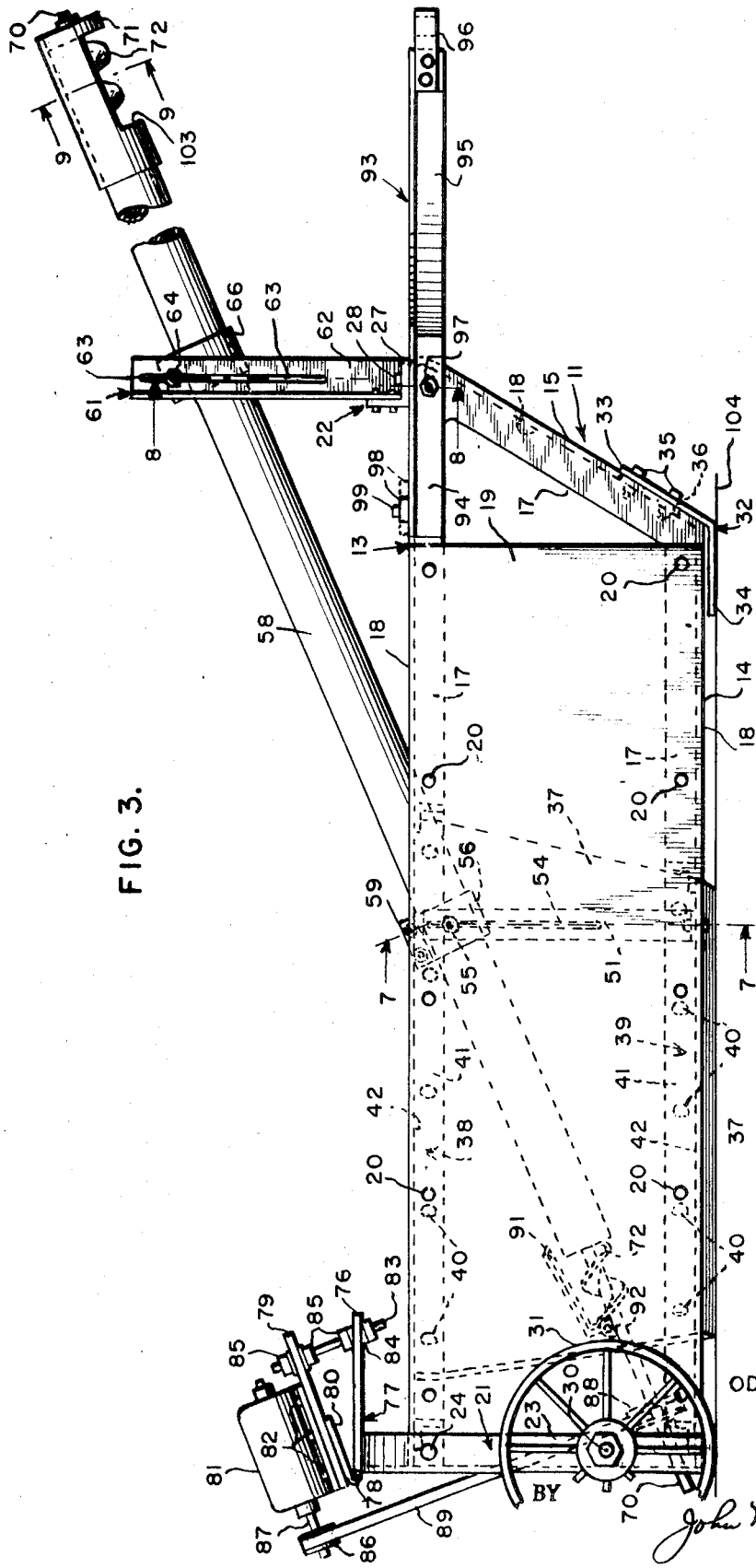
FIG. 3 is an enlarged fragmentary side elevational view, similar to FIG. 1.

Gauge members 32 cooperate with the wheels 31 for supporting the machine 10. Each gauge member 32 comprises a rigid bar having angularly disposed ends 33 and 34. The ends 33 are disposed against the outer sides of the flanges 18 of the front members 15 and are secured thereto by nut and bolt fastenings 35 which engage slots 36 in said flanges 18. The bar ends 34 are disposed beneath and parallel to the forward ends of the bottom flanges 18 of the runners 14, as seen in FIGS. 1 and 3, and may be adjusted upwardly and downwardly relative thereto, by loosening the fastenings 35 and moving the bar ends 33 upwardly or downwardly relative to the front portions 15. It will thus be seen that the bottom portions of the gauge members 32 combine with the wheels 31 for supporting the machine 10 when in operation, as illustrated in FIG. 1.

Figure 2:
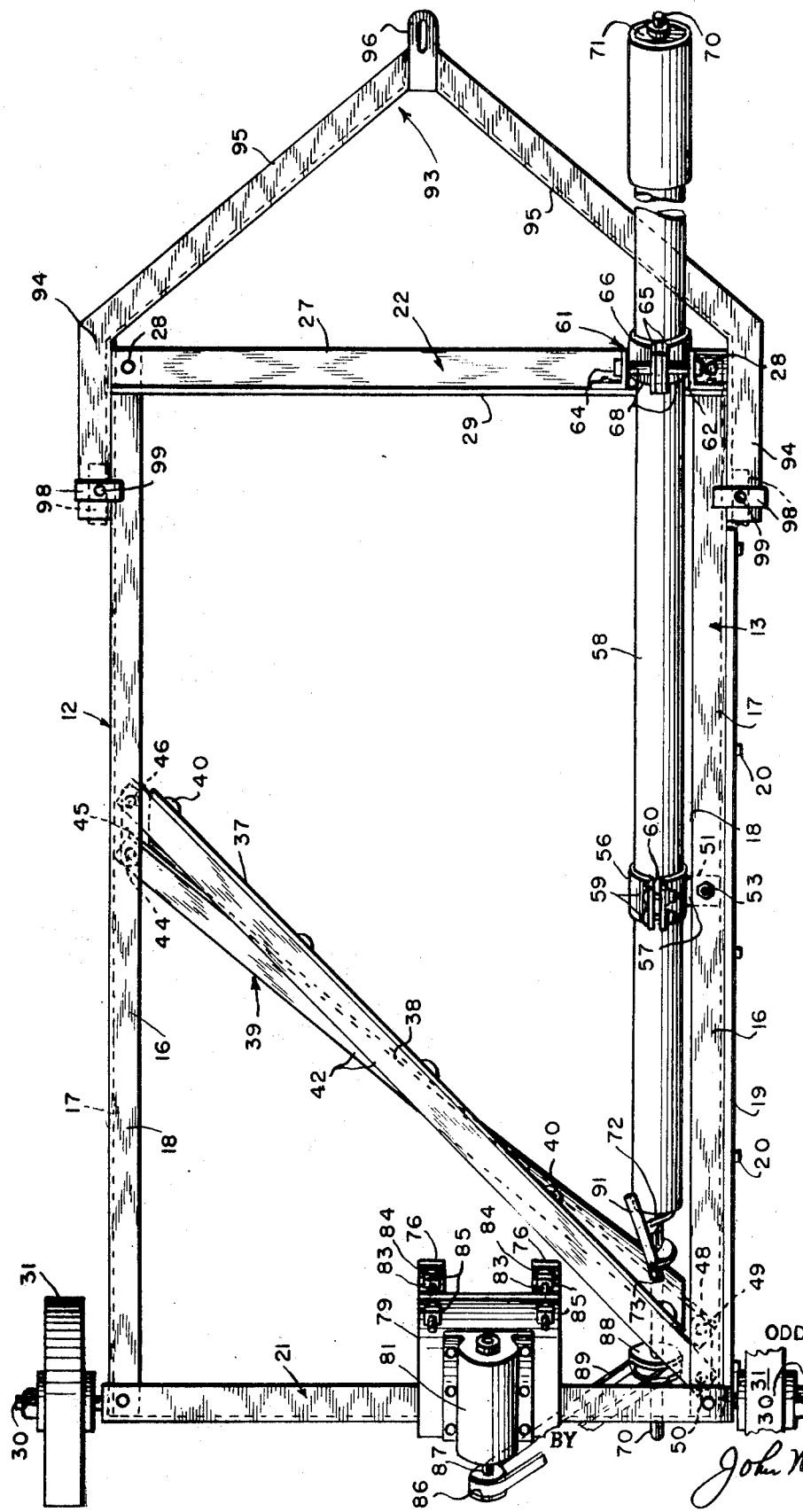
FIG. 2 is an enlarged fragmentary top plan view of the machine.

A scraping or grading blade 37 is disposed diagonally in the frame 11, between the sides 12 and 13, as best seen in FIG. 2. Top and bottom angle iron braces 38 and 39 are secured by fastenings 40 to the rear side of the blade 37, said fastenings extending through the vertical flanges 41 of said braces which are disposed against the rear side of the blade. The braces 38 and 39 extend to beyond the ends of the blade 37, as seen in FIG. 2. The top brace 38 has a rearwardly extending top flange 42 and the bottom brace 39 has a rearwardly extending bottom flange 42. The flange 42 of the bottom brace 39 has one end connected by a fastening 43 to the upper side of the bottom flange 18 of the runner 14 of side 12, approximately midway of the ends of said runner, as seen in FIG. 4. A fastening 44 extends through the flange 18 of the to member 16 of side 12, directly above the fastening 43, as seen in FIG. 2, and is connected to one end of a bar 45 which is disposed on the underside of said flange 18 and which extends forwardly from the fastening 44. The forward end of the bar 45 is connected by a fastening 46 to the top flange 42 of one end of the upper brace 38, so that the upper portion of the blade 37, at its forward end which is located adjacent the side 12, is tilted forwardly with respect to the bottom edge of said forward end of the blade. The flange 42 of the other rear end of the bottom brace 39 is secured by a fastening 47 to the bottom flange 18 of the runner 14 of side 13, adjacent the rear end of said runner. One end of a bar 48 is attached by a fastening 49 to the flange 18 of top member 16 of the side 13, said fastening being located directly above the fastening 47. The bar 48 extends rearwardly along the underside of said flange 18 and is attached at its rear end by a fastening 50 to the flange 42 of brace 38, as seen in FIG. 2, so that the rear end of the blade tilts upwardly and rearwardly in the opposite direction to the forward end thereof.

As best seen in FIG. 7, an upright bar 51 has outturned ends 52 which engage the adjacent sides of the flanges 18 of the side 13 and which are secured thereto by fastenings 53. The bar 51 has an elongated slot 54 to receive a nut and bolt fastening 55 which extends through a split clamping collar 56 which is located inwardly with respect to said side 13. A plate 57 is carried by the fastening 55 between the collar 56 and bar 51. A portion of a conveyor tube 58 is clamped in the collar 56 by tightening a nut and bolt fastening 59 which engages through the spaced terminals 60 of said collar.

Two spaced angle iron posts 61 are secured to and rise from the front brace 22 and have parallel flanges 62 which are provided with longitudinally extending slots 63 to receive the bolt of a bolt and nut fastening 64 which extends through said slots. The bolt of the fastening 64 extends through space terminals 65 of a split collar 66 which is suspended from said bolt between the posts 61. A spacing member 67 is mounted between the terminal 65, and spacing sleeves 66 are disposed on the bolt between the flanges 62 and jam pieces 69 which are mounted on the bolt between the sleeves 68 and the terminals 65. A portion of the conveyor tube 58 extends through the collar 66 which is located substantially above the level of the collar 56, as seen in FIG. 3. It will be readily apparent that the collars 56 and 66 in addition to being vertically adjustable when the fastenings 55 and 64 are loosened, are also angularly adjustable to assume positions in alignment with one another to accommodate the tube 58.

Figure 5:
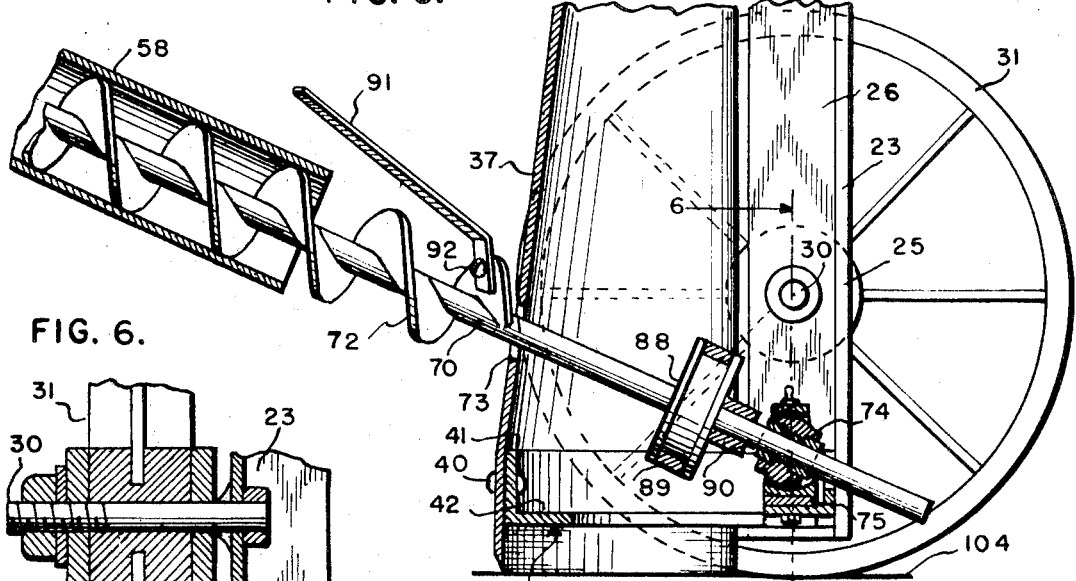
FIG. 5 is an enlarged fragmentary vertical sectional view, taken substantially along a plane as indicated by the line 5—5 of FIG. 4.
Figure 6:
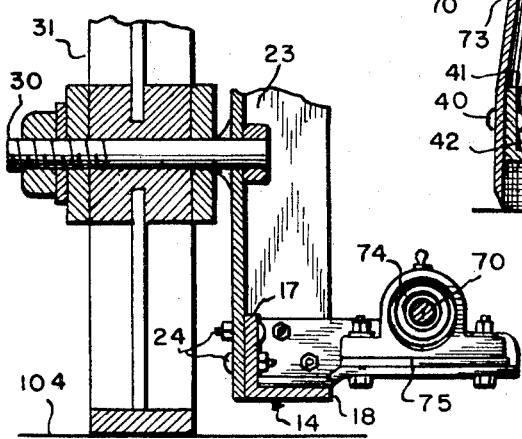
FIG. 6 is a fragmentary vertical sectional view, taken substantially along a plane as indicated by the line 6—6 of FIG. 5.

A shaft 70 extends axially through the tube 58 and has its froward end journaled in a front end plate 71 of said tube, as seen in FIGS. 2 and 3. A helical blade 72 is secured around the shaft 70 and is rotatable in the tube 58 to combine therewith and with said shaft to form a screw conveyor. As seen in FIGS. 2, 3 and 5, the rear end of the tube 58 terminates a short distance in front of the blade 37 and the helical blade 72 extends beyond said rear end of the tube 58 and to adjacent the blade 37. The shaft 71 extends beyond the rear end of the helical blade 72 and through an opening 73 in said blade 37. A rear portion of the shaft 71 is journaled in a self aligning bearing 74 which is supported by a bracket 75 which is fastened to and extends inwardly from the axle leg 23 which is attached to the right side 13 of the frame.

As best seen in FIGS. 3, 4 and 5, the bottom leaves 76 of two hinges 77 are secured to the horizontal flange 26 of the top portion of the arch 21 with the aligned hinge pins 78 of said hinges disposed crosswise of the frame 11 and at the rear of the hinges. A plate 79 is secured to the upper leaves 80 of the hinges 77 and the base plate of a motor 81 is mounted on and secured to the plate 79 by fastenings 82.

Bolts 83, having threaded ends, extend loosely through openings of the bottom leaves 76 and plate 79 and carry washers 84 and jam nuts 85 on both sides of the leaves 76 and plate 79, for angularly adjusting the plate 79 and motor 81 relative to the leaves 76 and the arch shaped axle 21 to correctly position a belt pulley 86 which is fixed to the driveshaft 87 of the motor 81 relative to a belt pulley 88 which is secured to the shaft 71. An endless belt 89 is trained around the pulleys 86 and 88 for driving the shaft 71 and conveyor blade 72 from the motor 81. The pulley 88 is disposed forwardly of the bearing 74 and a thrust collar 90 is fixed to the shaft 71 between the bearing 74 and pulley 88.

As seen in FIG. 5, a blade 91 is secured by a fastening 92 to the lower end of the conveyor blade 72 and extends upwardly therefrom to revolve around the open lower end of the tube 58, when the shaft 71 is revolved, for a purpose which will hereinafter be described.

A draft tongue 93, as best seen in FIG. 2, includes spaced apart substantially parallel rear portions 94, forwardly converging portions 95 which extend from the forward ends of the rear portions 94, and a coupling eye 96 which is secured between the forward ends of the portions 95. The portions 94 and 95 are formed of angle iron and said rear portions 94 straddle the forward ends of the sides 12 and 13 and are pivotally connected to the top forward portions of said sides by fastenings 97 which engage through the portions 94 near the forward ends thereof. Bars 98 are pivotally mounted on the rear ends of the portions 94 by fastenings 99 for movement between operative positions, crosswise of the portions 94, as seen in full lines in FIG. 2, and inoperative positions longitudinally of the portions 94, as seen in dotted lines. In the dotted lined positions of the bars 98, the tongue 93 can swing freely about its pivots 97. In the full line positions of the bars 98, the inner ends of said bars overlie the top members 16 to prevent the forward end of the tongue 93 from being swung upwardly above a horizontal position, as illustrated in FIG. 3, for purposes which will hereinafter be described.

The coupling eye 96 is shown in FIG. 1 engaging a coupling pin 100 of a self propelled draft vehicle 101 having a box or hopper 102. The coupling eye 96 has a loose fitting engagement with the pin 100 to enable the tongue 93 to pivot relative to the frame 11 about its pivots 97. The forward end of the conveyor tube 58 is disposed substantially beyond the forward end of the frame 11 so that its downwardly facing discharge opening 103 is positioned to discharge the material from the conveyor tube into the box or hopper 102.

The bottom edge of the blade 37 extends to below the bottom brace 39 and to beneath the runners 14, so as to scrape the surface 104 of the earth over which the machine 10 is propelled behind the draft vehicle 101, from left to right of FIG. 1. The depth to which the blade 37 will scrape is varied by adjustment of the gauge members 32, assuming that the bars 98 are in their positions of FIG. 1, disengaged from the frame sides 12 and 13, so that the tongue 93 can pivot relative to the frame 11, in order that the machine 10 will be supported solely by the gauge members 32 and wheels 31. Assuming that the machine 10 is being used to clean the earth floor of a chick house, not shown, the litter scraped by the forward end of the blade 37 which is tilted upwardly and forwardly, will be rolled forward and away from the side 12 and toward the side 13. The remainder of the litter engaged by the blade 37 will be deflected toward the rear end of said blade and toward the side 13 where it will be confined between the blade 37 and side plate 19 and deflected upwardly by the upward and rearward inclined rear end of the blade.

With the motor 81 operating to revolve the shaft 71 and conveyor screw 72 in a direction for conveying material upwardly and forwardly through the tube 58, counterclockwise as seen in FIG. 4, the litter will be picked up by the conveyor screw 72 and conveyed upwardly and forwardly through the tube 58 from its open rear end. The litter will be discharged from the conveyor tube 58 through the bottom discharge opening 103 into the hopper or box 102. The blade 91 revolving about the open rear end of the tube 58 will prevent the litter or other material being scraped and loaded from clogging said tube end and to insure a steady and even flow of the material into and through the tube.

With the bars 98 turned to their full line positions of FIG. 2 to prevent the tongue 93 from being swung upwardly past a horizontal position, the tongue can be supported by the draft coupling element 100 with the forward end of the frame 11 and the gauge members 32 elevated relative to the surface 104 so that the machine 10 will be supported only at its rear end by the wheels 31, for backing the machine or for transporting the machine to and from a work location and with the bottom edge of the blade 37 out of contact with the surface 104.

Various modifications and changes are contemplated and may be resorted to without departing from the function or scope of the invention.

I claim as my invention:

1. An earth scraper and loader comprising an elongated frame having a forward end and a rear end, said frame including transversely spaced substantially parallel frame sides, a scraping blade disposed diagonally within the frame and secured to the frame sides, said blade having a bottom scraping edge extending downwardly to below the frame sides and adapted to contact and scrape the earth's surface over which the frame is propelled, one of said frame sides having a wall cooperating with the rear end of the blade to define a collecting space in which the scrapings of the blade are confined, a screw-type conveyor, means mounting said conveyor in the frame with an open lower rear end thereof disposed in said collecting space, a motor, means supporting the motor on the rear end of the frame, said motor having a driving connection with the conveyor for revolving the conveyor screw in a direction for feeding the material through the conveyor for discharge from a forward end thereof, a draft tongue connected to and extending forwardly from the forward end of the frame and adapted to be connected to a draft vehicle by which the machine is propelled and into which the conveyor discharges, a pair of ground wheels supporting the rear end of the frame, and a pair of runners supporting the forward end of the frame.

2. A machine as in claim 1, said runners constituting gauge members and being vertically adjustable relative to the frame sides for varying the scraping depth of said blade.

3. A machine as in claim 2, said tongue being pivotally connected to the frame sides for swinging movement about a horizontal axis relative to the frame, and means for latching the tongue to the frame whereby the forward end of the frame will be supported by the tongue when attached to the draft vehicle for backing the machine or for transporting the machine, when not in operation, with said scraper blade elevated.

4. A machine as in claim 1, said means forming a driving connection between the conveyor and motor comprising a belt and pulley drive connecting the shaft of the conveyor screw and the motor shaft, and means for angularly adjusting the motor support means on the frame for positioning the motor shaft parallel to the conveyor shaft.

5. A machine as in claim 1, the rear inlet end of the conveyor tube being spaced forwardly from the rear end of the scraper blade, and a portion of the conveyor screw being exposed between said rear tube end and the scraper blade for agitating the material in said collecting space and for propelling the material into said inlet end of the tube.

6. A machine as in claim 5, and a blade attached to said exposed rear end of the conveyor screw and supported thereby to revolve around said inlet end of the tube to prevent clogging of the scraped material around said tube end.

7. A machine as in claim 1, said conveyor being inclined upwardly and forwardly, and said means mounting the conveyor in the frame being adjustable for varying the inclination of the conveyor.

8. A machine as in claim 1, and means connecting said scraper blade to the frame sides for supporting the forward end of the blade inclined upwardly and forwardly and the rear end of the blade inclined upwardly and rearwardly for deflecting the material scraped by the blade into said collecting space.

References Cited

UNITED STATES PATENTS

| | | | |
|---|---|---|---|
| 2,508,080 | 5/1950 | Stumpf | 37—108 |
| 3,091,873 | 6/1963 | West | 37—108 R |
| 908,078 | 12/1908 | Dobey | 172—393 |
| 2,939,539 | 6/1960 | Kramer | 172—396 |
| 3,115,715 | 12/1963 | Baldwin | 37—45 |
| 1,363,454 | 12/1920 | Bullock | 172—393 |

ROBERT E. PULFREY, Primary Examiner

R. T. RADER, Assistant Examiner

U.S. Cl. X.R.

172—781; 37—108